(12) United States Patent
Chhabra et al.

(10) Patent No.: US 10,585,817 B2
(45) Date of Patent: Mar. 10, 2020

(54) METHOD OF SIGNAL INTEGRITY AND POWER INTEGRITY ANALYSIS FOR ADDRESS BUS

(71) Applicant: Seagate Technology LLC, Cupertino, CA (US)

(72) Inventors: Nitin Kumar Chhabra, Maharashtra (IN); Gaurav Mathur, Maharashtra (IN); Anant Dalimkar, Maharashtra (IN)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/991,641

(22) Filed: May 29, 2018

(65) Prior Publication Data
US 2019/0370192 A1    Dec. 5, 2019

(51) Int. Cl.
*G06F 17/50* (2006.01)
*G06F 13/16* (2006.01)
*G01R 31/27* (2006.01)
*G06F 11/22* (2006.01)

(52) U.S. Cl.
CPC .................. *G06F 13/161* (2013.01)

(58) Field of Classification Search
CPC .......... G06F 17/50; G06F 13/16; G06F 11/22; G01R 31/27
See application file for complete search history.

(56) References Cited

U.S. PATENT DOCUMENTS

| | | | |
|---|---|---|---|
| 7,478,302 B2 | 1/2009 | Veendrick | |
| 9,508,407 B2 | 11/2016 | Kuzmenka et al. | |
| 9,557,926 B2 | 1/2017 | Troia | |
| 9,570,129 B2 | 2/2017 | Shaeffer et al. | |
| 9,798,693 B2 | 10/2017 | Hollis | |
| 10,331,827 B1* | 6/2019 | Shimanouchi | G06F 17/5036 |
| 2004/0015338 A1 | 1/2004 | Lawrence et al. | |
| 2004/0083398 A1 | 4/2004 | Wildgrube et al. | |
| 2004/0136462 A1* | 7/2004 | Chen | H04L 1/242 375/257 |
| 2005/0162948 A1* | 7/2005 | Swanson | G11C 7/1072 365/201 |
| 2005/0228912 A1 | 10/2005 | Walker et al. | |
| 2009/0030624 A1 | 1/2009 | He | |
| 2012/0128097 A1* | 5/2012 | Hughes | H04L 25/03343 375/296 |
| 2013/0249591 A1 | 9/2013 | Harker et al. | |
| 2014/0253226 A1 | 9/2014 | Zhou et al. | |
| 2015/0255933 A1 | 9/2015 | Sung et al. | |

* cited by examiner

*Primary Examiner* — David E Martinez
(74) *Attorney, Agent, or Firm* — Westman, Champlin & Koehler, P.A.

(57) ABSTRACT

A method of testing signal integrity and power integrity in an address bus includes determining a worst case switching scenario for victim bits versus aggressor bits on addresses on the address bus, generating a second switching scenario by eliminating repeated patterns and non-switching patterns for victim bits and aggressor bits, simulating address bus operation with the second switching scenario, and iteratively correlating simulation results with measured results to match simulated results with measured results.

10 Claims, 8 Drawing Sheets

| VALUES | MEASUREMENT | SIMULATION | DIFFERENCE | % DIFFERENCE |
|---|---|---|---|---|
| LOW VALUE | -272mV | -318mV | 46mV | 2.32% |
| HIGH VALUE | 1710 mV | 1750mV | 40mV | 2.02% |
| UNDERSHOOT | -272mV | -318mV | 46mV | 2.32% |
| OVERSHOOT | 210mV | 250mV | 40mV | 2.02% |
| PEAK TO PEAK | 1980mV | 2070mV | 90mV | 4.55% |

FIG.2

| VICTIM BIT | | | | |
|---|---|---|---|---|
| 0 to 0 | 0 to 0 | 0 to 1 | 1 to 0 | 1 to 1 |
| 0 to 1 | 0 to 0 | 0 to 1 | 1 to 0 | 1 to 1 |
| 1 to 0 | 0 to 0 | 0 to 1 | 1 to 0 | 1 to 1 |
| 1 to 1 | 0 to 0 | 0 to 1 | 1 to 0 | 1 to 1 |

FIG.3

| VICTIM BIT | AGGRESSOR BITS | |
|---|---|---|
| 0 to 0 | 0 to 1 | 1 to 0 |
| 0 to 1 | 0 to 1 | 1 to 0 |
| 1 to 0 | 0 to 1 | 1 to 0 |
| 1 to 1 | 0 to 1 | 1 to 0 |

FIG.4

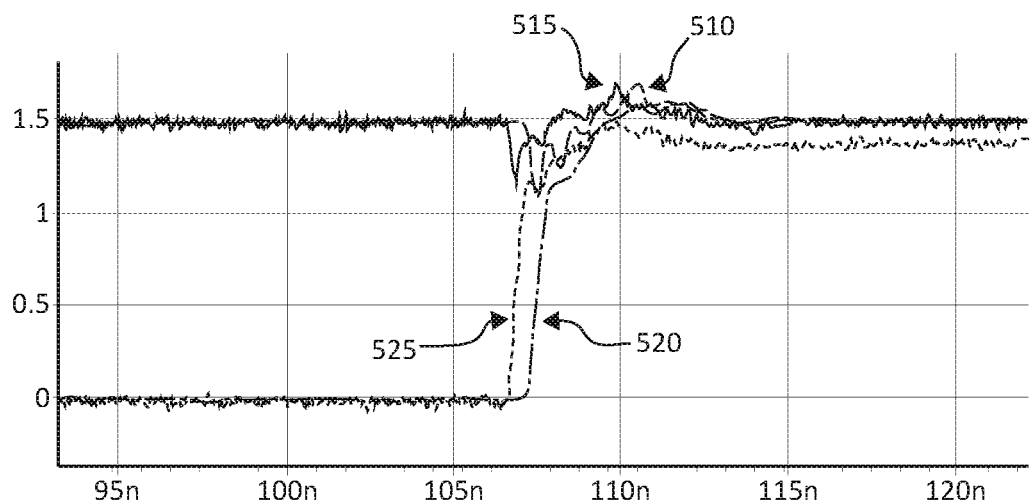
FIG. 5G
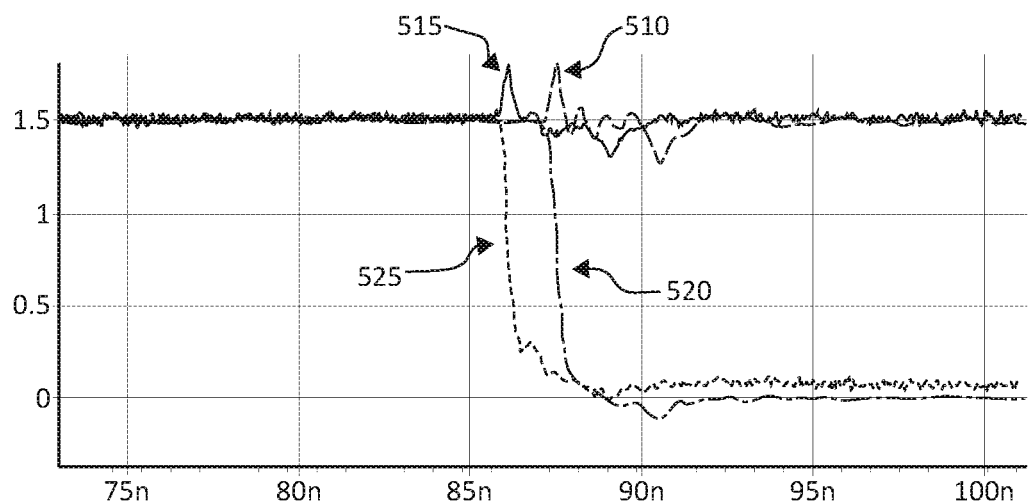
FIG. 5H
| VALUES | MEASUREMENT | SIMULATION | DIFFERENCE | % DIFFERENCE |
|---|---|---|---|---|
| LOW VALUE | -330mV | -347mV | 17mV | 0.80% |
| HIGH VALUE | 1800 mV | 1791mV | 9mV | 0.42% |
| UNDERSHOOT | -330mV | -347mV | 17mV | 0.80% |
| OVERSHOOT | 300mV | 291mV | 9mV | 0.42% |
| PEAK TO PEAK | 2130mV | 2138mV | 8mV | 0.38% |
FIG. 6

ND OF SIGNAL INTEGRITY AND
POWER INTEGRITY ANALYSIS FOR
ADDRESS BUS

SUMMARY

A method of generating a signal integrity and power integrity analysis pattern on an address bus includes determining a worst case switching scenario for victim bits versus aggressor bits on addresses on the address bus and determining an initial input pattern for simulation testing of the worst case switching scenario. The method also includes reducing the initial input pattern to a second input pattern to remove repeated switching scenarios, reducing the second input pattern to a third input pattern to remove switching scenarios without switching aggressor bits, and reducing the third input pattern to a final input pattern to remove switching scenarios that do not need to be reset from a previous switching scenario.

A system of the disclosure includes an integrated circuit including an address bus, a module generating a worst case switching scenario for victim bits versus bits on addresses on the address bus, a module simulating an address bus operation with the worst case switching scenario, and a module iteratively correlating simulation results with measured results to match simulated results with measured results.

A method of testing signal integrity and power integrity in an address bus includes determining a worst case switching scenario for victim bits versus aggressor bits on addresses on the address bus, generating a second switching scenario by eliminating repeated patterns and non-switching patterns for victim bits and aggressor bits, and simulating address bus operation with the second switching scenario. The method also includes iteratively correlating simulation results with measured results to match simulated results with measured results.

This summary is not intended to describe each disclosed embodiment or every implementation of the method of signal integrity and power integrity analysis. Many other novel advantages, features, and relationships will become apparent as this description proceeds. Other features and benefits that characterize embodiments of the disclosure will be apparent upon reading the following detailed description and review of the associated drawings.

BRIEF DESCRIPTION OF THE DRAWINGS

FIG. 2 illustrates a table summarizing example values of FIG. 1.

FIG. 3 is a table of possible scenarios for victim bits and address bits of the present disclosure.

FIG. 4 is a table of scenarios for signal integrity and power integrity analysis for which embodiments of the present disclosure can be used.

FIGS. 5a to 5h illustrate example graphs of signal integrity and power integrity analysis for the scenarios shown in FIG. 4.

FIG. 6 is a table summarizing example values according to an embodiment of the present disclosure.

DETAILED DESCRIPTION

Figure 1:
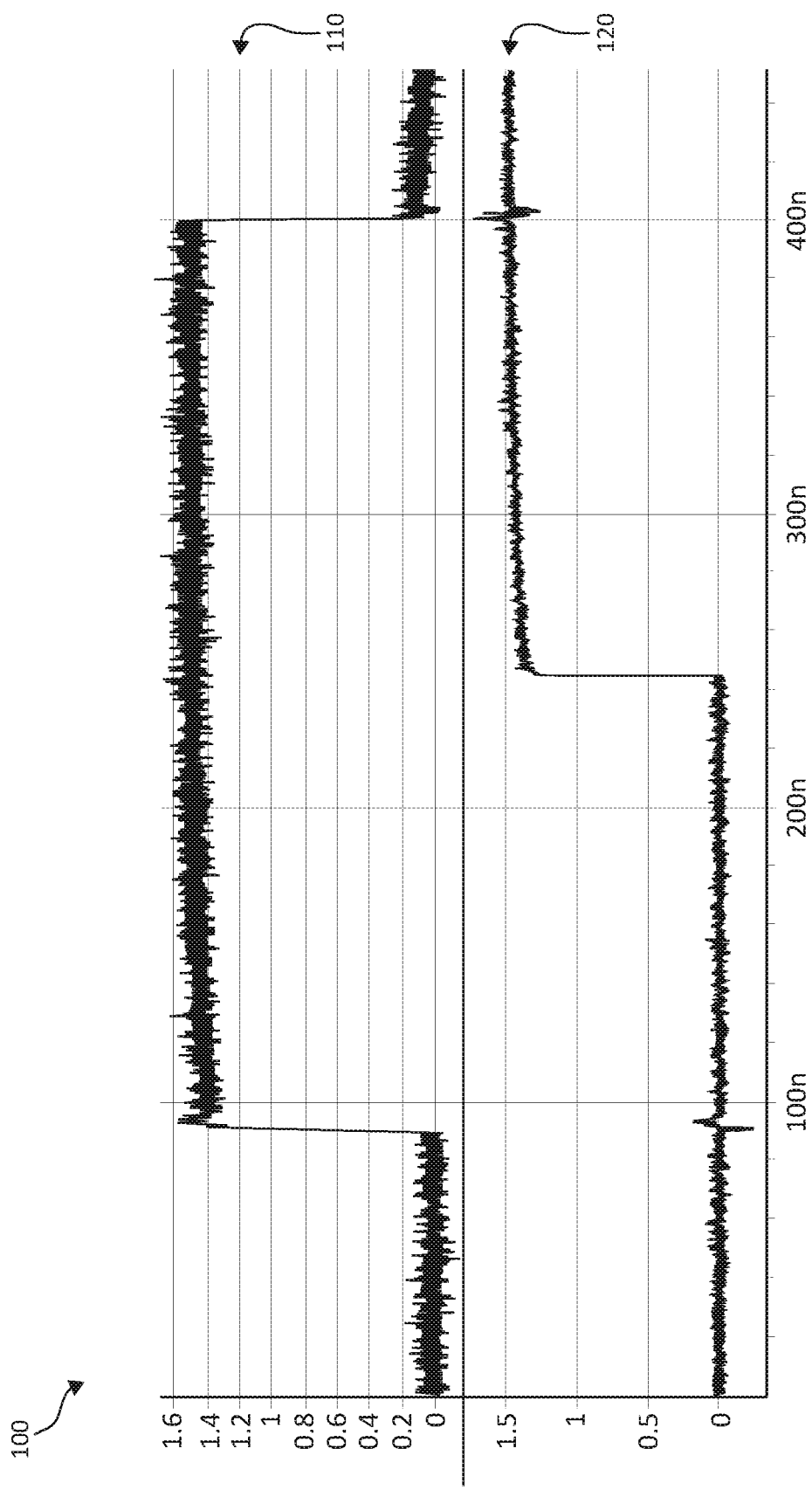
FIG. 1 illustrates an example graph of signal integrity and power integrity analysis in which embodiments of the present application can be used.

Although the present disclosure has been described with reference to embodiments, workers skilled in the art will recognize that changes may be made in form and detail without departing from the scope of the disclosure. The present disclosure generally describes a method of signal integrity and power integrity analysis of an address bus.

With power available to integrated circuits decreasing, and with the continued focus on providing smaller and smaller parts, terminating resistors on address busses are being removed. The termination resistors of the address lanes or busses may be removed in order to save product space and lower component count. This also helps in low power designs by saving the resistive power loss across the termination resistor. While this is a cost, space, and power saving measure, such removal may cause issues with signal reflection. Signal reflection may increase the possibility of memory issues such as overshoots, undershoots, and electromagnetic compliance violations, and it is useful to validate these effects during the design phase for practical applications. Signal integrity and power integrity (SI-PI) analysis concerns the proper operation of digital circuits and is used to simulate real world operation of a design. Signal integrity (SI) analysis concerns determining that a transmitted logical "1" or logical "0" looks like a "1" or "0" to a receiver. Power integrity analysis may determine that drivers and receivers are provided with adequate current to send and receive a "1" or a "0".

Traditional SI-PI methods are used for analysis of both data and address busses of memories, such as double data rate (DDR) memories. DDR data and address busses may share the same driver and receiver, e.g., I/O buffers, as well as the same channel, e.g., package and printed circuit board (PCB) routing. SI-PI analysis methodology for data busses or data lanes may be based on "worst pattern" and "worst switching" actives for the data. SI-PI analysis for the data bus and address bus may be similar from a design aspect and hardware usage aspect and, in general, a similar methodology may be implemented for an address bus as well.

However, traditional methods of SI-PI analysis used for address busses do not work well for memories with removed termination resistance. Specifically, the address bus may have a different pattern and switching functionality than that of a data bus. Further, this pattern and functionality may not be as active as that of the data bus. Because the activity on the address bus may be less than that of a data bus, the worst case for the data bus may not be the same as the worst case for the address bus and implementing the same analysis would be an over design. The present disclosure describes methods for reducing the amount of time for SI-PI analysis on an address bus in DDR memory uses, as well as providing real world application and validation correlated with measurement. The detailed description and claimed subject matter are not limited to the implementations that solve any or all of the disadvantages noted herein.

When implementing an SI-PI analysis of a DDR address bus according to the present disclosure, DDR data is sampled at both edges of a clock signal, e.g., the rising edge and the falling edge. In comparison, the address is sampled at a single edge, thereby reducing the frequency of operation by half. A setup and hold stage for the address may also be relaxed, and the operation may be two times reduced for the address. According to DDR protocol for data storage applications, the address may then switch once and remain constant for a burst period, and so there will be extra time between address changes. Thus, the address will not switch at every clock cycle, and for practical applications in data storage operations and according to DDR protocol, at least six clock cycles may occur for a second address switching.

As described above, when termination resistance is removed from the address bus, signal ringing is a potential issue. Accordingly, for non-terminated address busses, signal ringing is checked as a priority by determining the worst-case scenarios for various aspects, such as power integrity and signal integrity. The various scenarios may be modeled in simulation and then correlated with measurements to provide analysis based on real application and validation. For example, because I/O switches require power, from a power integrity aspect, a worst-case scenario could be if all address bits switch at substantially the same instant. From a signal integrity aspect, a worst-case scenario may be when one address bit, e.g., a victim bit, switches in one direction, while other address bits, e.g., aggressor bits, switch in an opposite direction. For example, to correlate the simulation with the measurements, sixteen cases are possible with a group of sixteen bits divided into two parts of one single bit and fifteen other bits. The single bit, or victim bit, may move in one direction while the remaining bits or aggressor bits move in the opposite direction. From a cross-talk aspect, a worst-case scenario could be if the victim bit is at a stable voltage, e.g., steady at a logical "1" value or a logical "0" value, and all aggressor bits change, such as from a logical "0" to a logical "1", or a logical "1" to a logical "0", at the same instant.

The first part of one method embodiment of the present disclosure is to determine a correlation between a simulation of the address and a measurement of the address. FIG. 1 illustrates an example of a graph comparing simulation versus measurement correlation for overshoots and undershoots. Graph 100 shows an example measurement taken when a visual overshoot and undershoot signature are observed and the measurement is then correlated with a simulation using the same inputs. The top portion of the graph 100 illustrates simulation versus measurement correlation of an aggressor bit 110 and a lower portion of graph 100 illustrates simulation versus measurement correlation of a victim bit 120. The aggressor bit 110 starts low at a logical "0" value, then rises to a high or logical "1" value, remains steady, and then falls to logical "0". As can be seen, the victim bit 120 starts low at logical "0" and experiences noise when aggressor bit 110 changes to logical "1". Victim bit 120 then rises to logical "1" and remains steady, but experiences noise when aggressor bit 110 changes from logical "1" to logical "0".

FIG. 2 is a table summarizing example values of the graph of FIG. 1. Peak-to-peak measurement values are taken as a reference for a percent difference calculation. As can be seen, the undershoot difference is 46 mV and the overshoot difference is 40 mV and they are then taken as a percent difference of 2.32% and 2.02% respectively. This example simulation versus measurement correlation may be considered acceptable and so the next step of the method may then be implemented. However, if the correlation is not considered acceptable, the simulation step may be updated iteratively until an acceptable match is achieved.

FIG. 3 is a table of the possible combinations for aggressor bits and victim bits. Sixteen scenarios are possible for victim and aggressor bits. The victim bit may remain at a logical "0" value or a logical "1" value, or the victim bit may move from logical "0" to a logical "1" or logical "1" to logical "0". Aggressor bits may also remain at logical "0" or logical "1" or move from logical "0" to logical "1" or logical "1" to logical "0". The pattern of possible scenarios is verified by measurement and a similar input pattern may be implemented in the simulation environment. However, in case the same stimuli from measurement were taken for simulation, the run time for one simulation may take more than one month of time using a high-end computing machine. Thus, it is impractical or may not be feasible to use the same stimuli in simulation as is used in measurement, and methods according to embodiments of the present disclosure may be applied to reduce the number of stimuli.

One step for reducing the stimuli in simulation concerns the clock cycles between address switching. Per DDR protocol, an address bus may have at least six clock cycles for a second address switching. Thus, for measurement purposes, a time slice may be chosen from six cycles before and six cycles after any of the possible scenario occurrences, e.g., one of the possible scenarios of FIG. 3. Another step to reduce stimuli includes removing repeated scenarios from the simulation. For example, one scenario may have thirteen bits switching, and then thirteen bits more to come back to an original state for the next transition, and the scenario would be twenty-six bits long. Thus, new stimuli would be 26*16=416 bits long for a simulation to cater to the possible cases. The run time for this simulation may take approximately two days using a high-end computing machine.

Further steps may also reduce stimuli, such that scenarios where aggressor bits are not switching but remain stable at a logical "1" or a logical "0" do not create signal integrity or power integrity issues. Thus, scenarios where aggressor bits are not switching may be ignored. FIG. 4 is a table of scenarios for SI-PI analysis where aggressor bits that are not switching are ignored. Thus, new stimuli would be 26*8=208 bits long for a simulation to cater to the cases. The run time for simulation of these scenarios may be approximately one day using a high-end computing machine.

The run time may be further reduced in cases when bits do not switch to come back to an original state, that is, ending a simulation sequence at a logical "1" or logical "0" and starting the next sequence at the same logical state. For example, in the scenarios of FIG. 4, a bit was returned to the original state twice. Thus, total stimuli length would be 13*6+26*2=130 bits long. Run time for simulation of these scenarios would decrease to on the order of fifteen hours using a high-end computing machine. Once the SI-PI analysis is performed the results are correlated with the measurement.

Figure 5A:
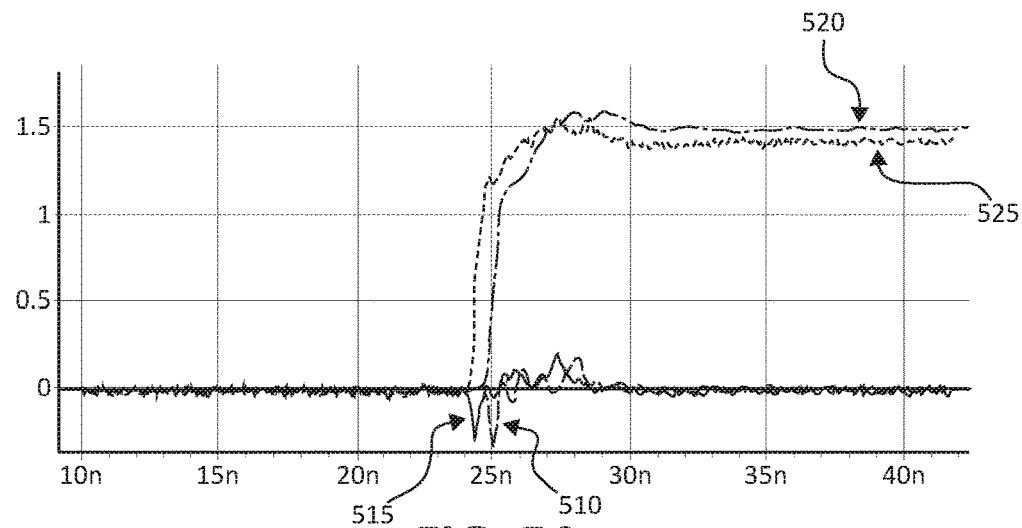

FIGS. 5a to 5h are graphs of exemplary measurement versus simulation correlations for the scenarios shown in FIG. 4. FIG. 5a graphs a simulation versus measurement correlation for a scenario with the victim bit moving from logical "0" to logical "0" and aggressor bit moving from logical "0" to logical "1". Here FIG. 5a shows sampled victim bit 510 and measured victim bit 515 remaining relatively steady for a logical "0" and sampled aggressor bit 520 and measured aggressor bit 525 start low for logical "0" and increase to a high for logical "1".

Figure 5B:
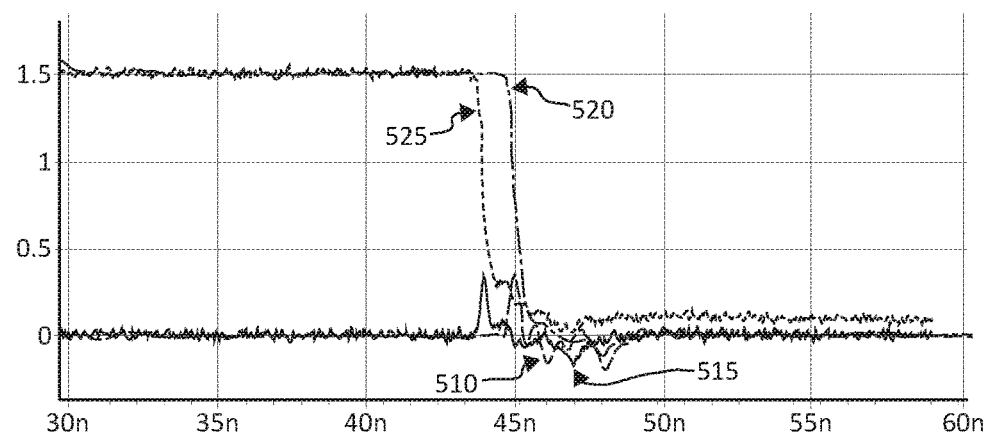

FIG. 5b graphs a simulation versus measurement correlation for a scenario with the victim bit moving from logical "0" to logical "0" and aggressor bit moving from logical "1" to logical "0". Here, FIG. 5b shows sampled victim bit 510 and measured victim bit 515 remaining relatively steady for a logical "0" and sampled aggressor bit 520 and measured aggressor bit 525 starting high at a logical "1" and decreasing to logical "0".

Figure 5C:
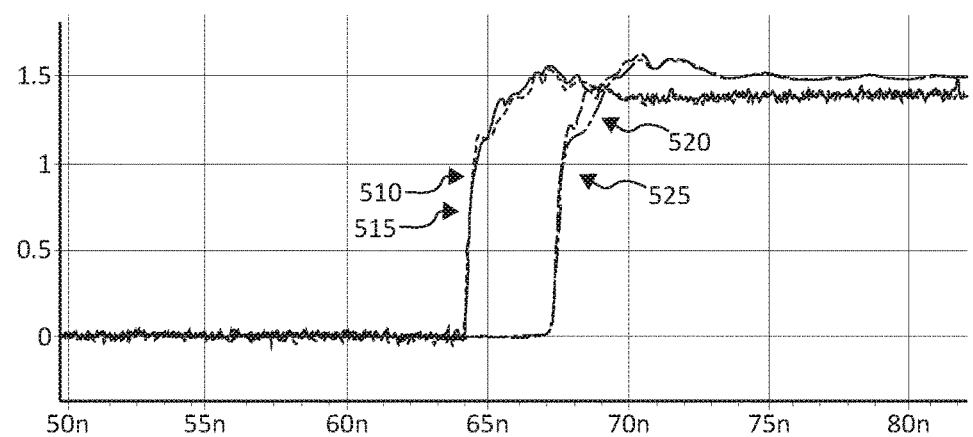

FIG. 5c graphs a simulation versus measurement correlation for a scenario with the victim bit moving from logical "0" to logical "1" and aggressor bit moving from logical "0" to logical "1". Here, FIG. 5c shows sampled victim bit 510 and measured victim bit 515 starting low for a logical "0" and increasing to a high for logical "1", and the sampled aggressor bit 520 and measured aggressor bit 525 starting low for logical "0" and, at a later time, increasing to a high for logical "1".

Figure 5D:
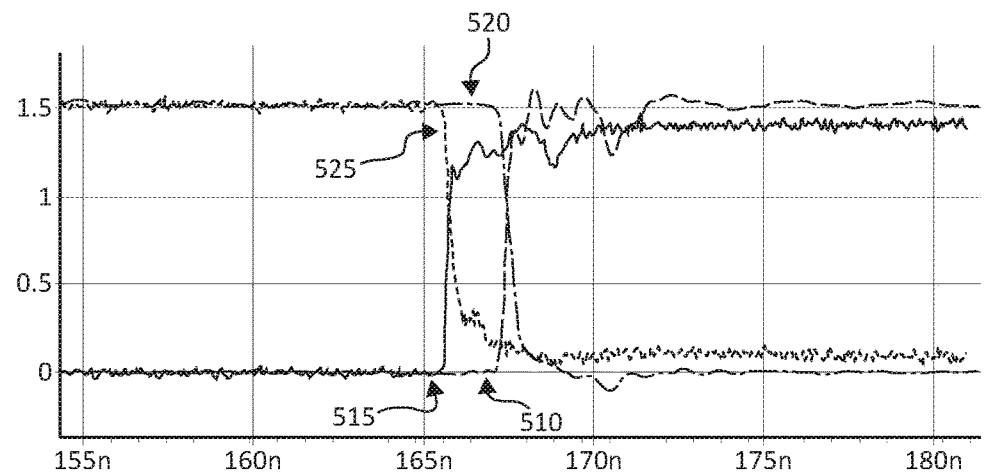

FIG. 5d graphs a simulation versus measurement correlation for a scenario with the victim bit moving from logical "0" to logical "1" and aggressor bit moving from logical "1" to logical "0". Here FIG. 5d shows sampled victim bit 510 and measured victim bit 515 starting low for a logical "0" and increasing to a high for logical "1", and the sampled aggressor bit 520 and measured aggressor bit 525 starting high for logical "1" and decreasing to a low for a logical "0".

Figure 5E:
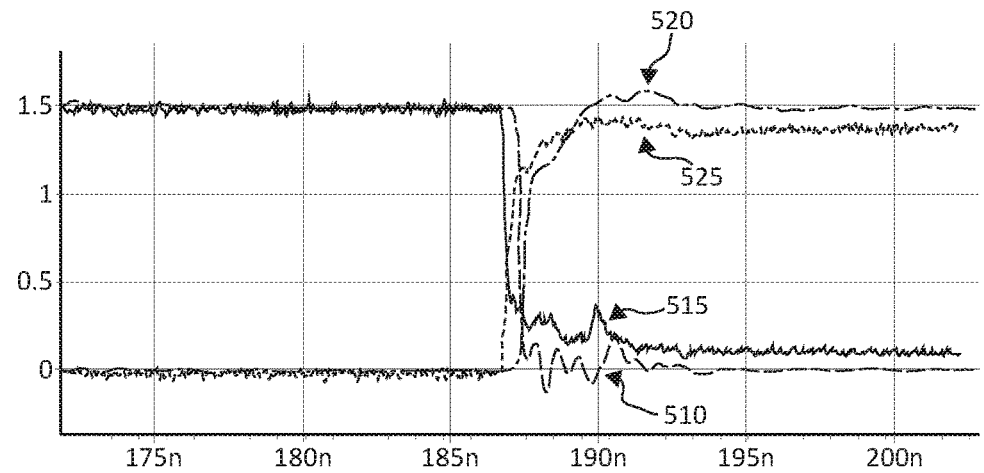

FIG. 5e graphs a simulation versus measurement correlation for a scenario with the victim bit moving from logical "1" to logical "0" and aggressor bit moving from logical "0" to logical "1". Here FIG. 5e shows sampled victim bit 510 and measured victim bit 515 starting high for a logical "1" and decreasing to a low for logical "0", and the sampled aggressor bit 520 and measured aggressor bit 525 starting low for logical "0" and increasing to a high for a logical "1".

Figure 5F:
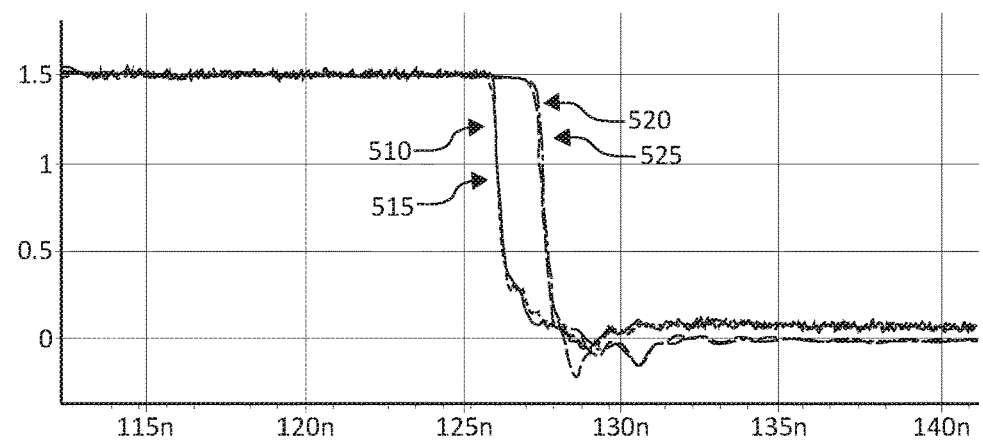

FIG. 5f graphs a simulation versus measurement correlation for a scenario with the victim bit moving from logical "1" to logical "0" and aggressor bit moving from logical "1" to logical "0". Here FIG. 5f shows sampled victim bit 510 and measured victim bit 515 starting high for a logical "1" and decreasing to a low for logical "0", and the sampled aggressor bit 520 and measured aggressor bit 525 starting high for logical "1" and decreasing to a low for a logical "0".

FIG. 5g graphs a simulation versus measurement correlation for a scenario with the victim bit moving from logical "1" to logical "1" and aggressor bit moving from logical "0" to logical "1". Here FIG. 5g shows sampled victim bit 510 and measured victim bit 515 remaining relatively steady at a high for logical "1" and the sampled aggressor bit 520 and measured aggressor bit 525 starting low for logical "0" and increasing to a high for a logical "1".

Finally, FIG. 5h graphs a simulation versus measurement correlation for a scenario with the victim bit moving from logical "1" to logical "1" and aggressor bit moving from logical "1" to logical "0". Here FIG. 5g shows sampled victim bit 510 and measured victim bit 515 remaining relatively steady at a high for logical "1" and the sampled aggressor bit 520 and measured aggressor bit 525 starting high for logical "1" and decreasing to a low for logical "0".

FIG. 6 is a table summarizing the values for the correlation graphs of FIG. 5. The measurement of peak-to-peak values is taken as a reference for percent calculation. As can be seen, the percent difference for the peak-to-peak values of measurement versus simulation is 0.38% and the results of the example correlation shows that the simulation and measurement values substantially match. Therefore, the above method for SI-PI analysis of DDR address bus is based on real application and validation backed up by measurement correlation and is an improvement on verification of hardware design.

Figure 7:
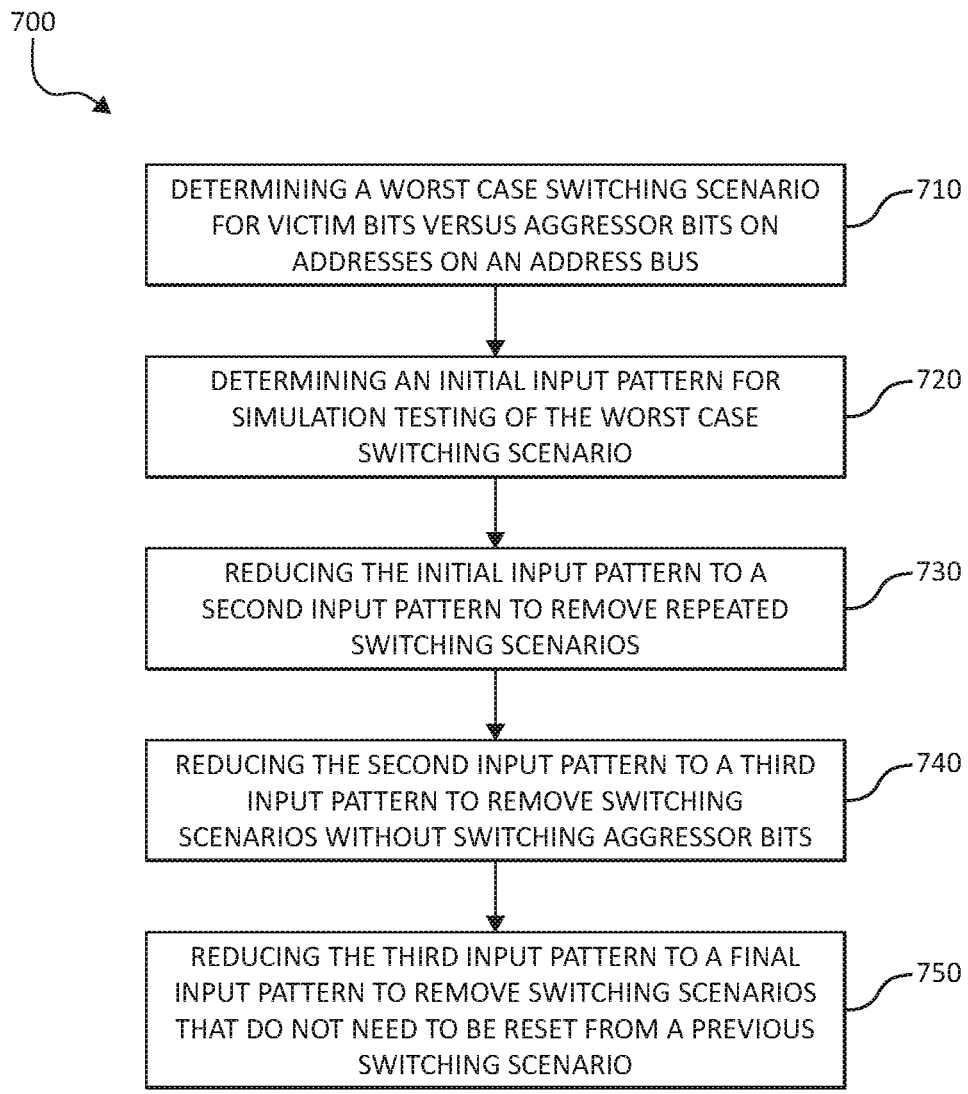
FIG. 7 illustrates a flow diagram of a method according to an embodiment of the present disclosure.

FIG. 7 illustrates a flow chart of a method of SI-PI analysis according to an embodiment of the present disclosure. A method 700 of generating an SI-PI analysis pattern on an address bus includes determining 710 a worst case switching scenario for victim bits versus aggressor bits on addresses on the address bus, determining 720 an initial pattern for simulation testing of the worst case switching scenario, reducing 730 the initial input pattern to a second input pattern to remove repeated switching scenarios, reducing 740 the second input pattern to a third input pattern to remove switching scenarios without switching aggressor bits, e.g., switching scenarios when aggressor bits do not change, and reducing 750 the third input pattern to a final input pattern to remove switching scenarios that do not need to be reset from a previous switching scenario.

Figure 8:
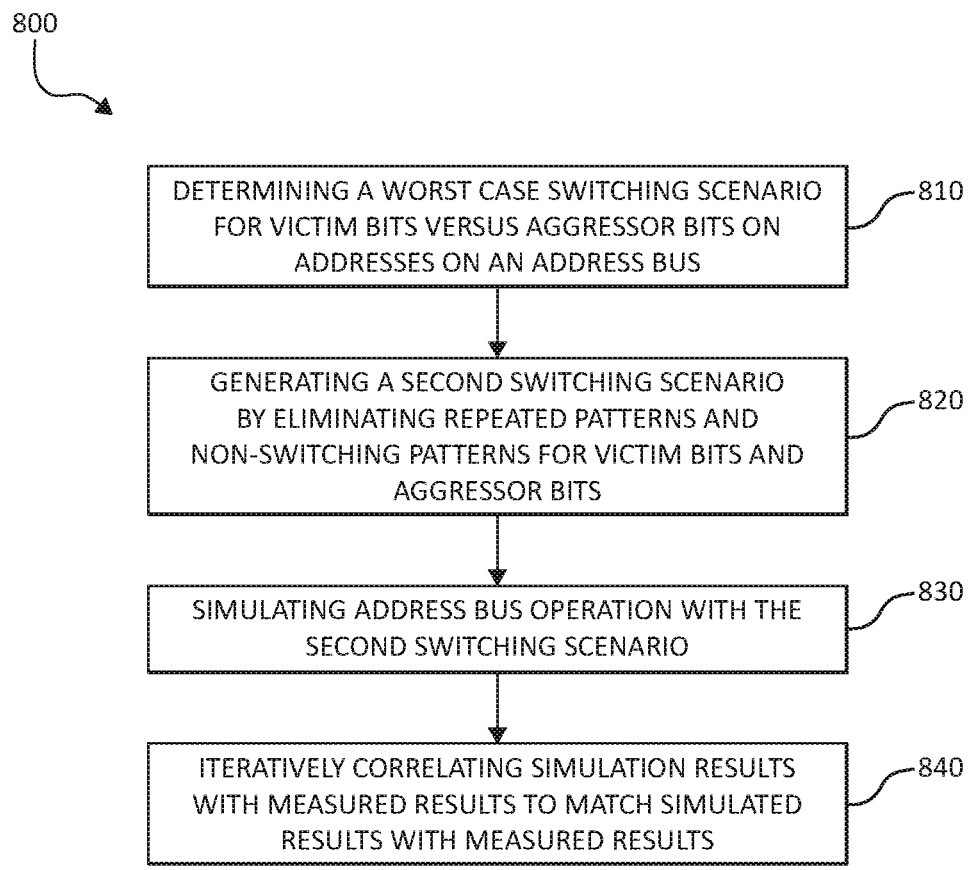
FIG. 8 illustrates a flow diagram of a method according to an embodiment of the present disclosure.

FIG. 8 illustrates a flow chart of a method of SI-PI analysis according to an embodiment of the present disclosure. A method 800 of testing signal integrity and power integrity in an address bus includes determining 810 a worst case switching scenario for victim bits versus aggressor bits on addresses on an address bus, generating 820 a second switching scenario by eliminating repeated patterns and non-switching patterns for victim bits and aggressor bits, simulating 830 address bus operation with the second switching scenario, and iteratively correlating simulation results 840 with measured results to match simulated results with measured results.

Figure 9:
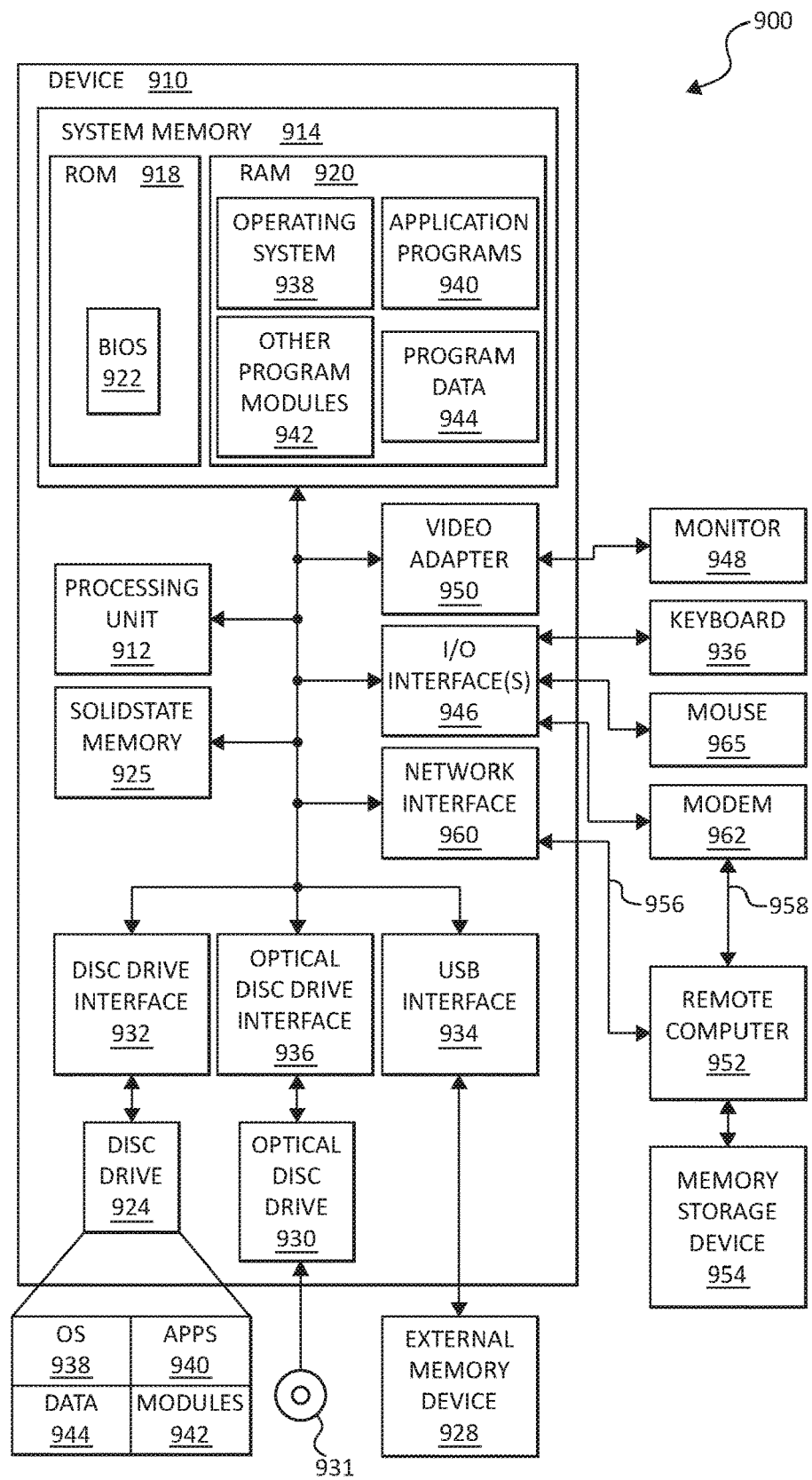
FIG. 9 illustrates an example of a computing environment in which at least some of the present embodiments may be implemented.

FIG. 9 illustrates an example of a suitable computing environment 900 in which the present embodiments may be implemented. The computing environment 900 is only one example of a suitable computing environment and is not intended to suggest any limitation as to the scope of use or functionality of the present embodiments.

The computing environment of FIG. 9 includes a processing unit 912, a system memory 914 and a system bus 916 that couples the system memory 914 to the processing unit 912. System memory 914 includes read only memory (ROM) 918 and random access memory (RAM) 920. A basic input/output system 922 (BIOS), containing the basic routines that help to transfer information between elements within the computing device 910, is stored in ROM 918. Computer-executable instructions that are to be executed by processing unit 912 may be stored in random access memory 920 before being executed.

Embodiments of the disclosure can be applied in the context of computer systems other than computing environment 900. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the disclosure may be accomplished utilizing either local or remote storage devices, or simultaneously utilizing both local and remote storage devices.

Computing device 910 further includes a hard disc drive 924, an external memory device 928, and an optical disc drive 930. External memory device 928 can include an external disc drive or solid state memory that may be attached to computing device 910 through an interface such as Universal Serial Bus interface 934, which is connected to system bus 916. Optical disc drive 930 can illustratively be utilized for reading data from (or writing data to) optical media, such as a CD-ROM disc 931. Hard disc drive 924 and optical disc drive 930 are connected to the system bus 916 by a hard disc drive interface 932 and an optical disc drive interface 936, respectively. The drives and external memory devices and their associated non-transitory computer-readable media provide nonvolatile storage media for the computing device 910 on which computer-executable instructions and computer-readable data structures may be stored. Other types of media that are readable by a computer may also be used in the exemplary operation environment.

A number of program modules may be stored in the drives and RAM 920, including an operating system 938, one or more application programs 940, other program modules 942 and program data 944. In particular, application programs 940 can include code used to carry out signal integrity and power integrity analysis as shown in FIGS. 1-8.

Input devices including a keyboard 963 and a mouse 965 are connected to system bus 916 through an input/output interface 946 that is coupled to system bus 916. Monitor 948 is connected to the system bus 916 through a video adapter 950 and provides graphical images to users. Other peripheral output devices (e.g., speakers or printers) could also be included but have not been illustrated. In accordance with some embodiments, monitor 948 comprises a touch screen that both displays input and provides locations on the screen where the user is contacting the screen.

The computing device 910 may operate in a network environment utilizing connections to one or more remote computers, such as a remote computer 952. The remote computer 952 may be a server, a router, a peer device, or other common network node. Remote computer 952 may include many or all of the features and elements described in relation to computing device 910, although only a memory storage device 954 has been illustrated in FIG. 9. The network connections depicted in FIG. 9 include a local area network (LAN) 956 and a wide area network (WAN) 958. Such network environments are commonplace in the art.

The computing device 910 is connected to the LAN 956 through a network interface 960. The computing device 910 is also connected to WAN 958 and includes a modem 962 for establishing communications over the WAN 958. The modem 962, which may be internal or external, is connected to the system bus 916 via the I/O interface 946. Modem 962 may be a wired modem or wireless modem that receives and transmits signals through an antenna.

In a networked environment, program modules depicted relative to the computing device 910, or portions thereof, may be stored in the remote memory storage device 954. For example, application programs may be stored utilizing memory storage device 954. In addition, data associated with an application program may illustratively be stored within memory storage device 954. It will be appreciated that the network connections shown in FIG. 9 are exemplary and other means for establishing a communications link between the computers, such as a wireless interface communications link, may be used.

A system for SI-PI analysis according to an embodiment of the disclosure includes an integrated circuit including an address bus, a module generating a worst case switching scenario for victim bits versus aggressor bits on the address bus, a module simulating an address bus operation with the worst case switching scenario, and a module iteratively correlating simulation results with measured results to match simulated results with measured results.

The methods of SI-PI analysis as described herein have many advantages. First, the methods provide a dedicated methodology for DDR address bus analysis. The methods also improve cost effectiveness and save product area as they allow an open termination case. Further, the methods are reliable, are neither too optimistic nor too pessimistic in their analysis, and allow signal overshoot and undershoot to be considered during the address bus design phase. Moreover, the methods are improved for simulation time and validation, as the simulation time may be reduced from more than one month of time for an unimproved simulation input to fifteen hours when applying the methods described herein.

The illustrations of the embodiments described herein are intended to provide a general understanding of the method of the various embodiments. The illustrations are not intended to serve as a complete description of all of the elements and features of methods and systems described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A system comprising:
   an integrated circuit including an address bus;
   a switching scenario module generating a worst case switching scenario for victim bits versus aggressor bits on addresses on the address bus;
   a module simulating an address bus operation with the worst case switching scenario;
   the switching scenario module generating a second switching scenario that ignores repeated patterns and non-switching patterns for at least some victim bits and at least some aggressor bits; and
   a module iteratively correlating simulation results with measured results to match simulated results with measured results.

2. The system of claim 1, wherein:
   the module simulating an address bus operation simulates address bus operation with the second switching scenario.

3. The method of claim 2, wherein the module iteratively correlating simulation results with measured results validates the simulated results during a design phase of the address bus.

4. A method of testing signal integrity and power integrity in an address bus, comprising:
- determining a worst case switching scenario for victim bits versus aggressor bits on addresses on the address bus;
- generating a second switching scenario in which repeated patterns and non-switching patterns for victim bits and aggressor bits are ignored;
- simulating address bus operation with the second switching scenario; and
- iteratively correlating simulation results with measured results to match simulated results with measured results.

5. The method of claim 4, and further comprising validating the simulated results during a design phase of the address bus.

6. The method of claim 4, and wherein the measured results include a time slice from before and after a switching scenario occurs.

7. The method of claim 6, and wherein the time slice comprises a range from at least six clock cycles before and six clock cycles after the switching scenario occurs.

8. The method of claim 4, and wherein the worst case switching scenario for signal integrity occurs when the victim bit switches in one direction and the aggressor bit switches in an opposite direction.

9. The method of claim 4, and wherein the worst case switching scenario for power integrity occurs when victim bits and aggressor bits switch at substantially the same instant.

10. The method of claim 4, and wherein the worst case switching scenario for cross-talk occurs when victim bits remain steady and the aggressor bits switch.

* * * * *